United States Patent
Pan et al.

(10) Patent No.: US 12,536,620 B2
(45) Date of Patent: Jan. 27, 2026

(54) METHOD FOR SEGMENTING AND DENOISING TRIANGLE MESH

(71) Applicant: OPT MACHINE VISION TECH CO., LTD., Guangdong (CN)

(72) Inventors: Wei Pan, Guangdong (CN); Chaofan Dai, Guangdong (CN); Xuequan Lu, Guangdong (CN)

(73) Assignee: OPT MACHINE VISION TECH CO., LTD., Guangdong (CN)

( * ) Notice: Subject to any disclaimer, the term of this patent is extended or adjusted under 35 U.S.C. 154(b) by 365 days.

(21) Appl. No.: 18/026,588

(22) PCT Filed: Apr. 15, 2021

(86) PCT No.: PCT/CN2021/087447
§ 371 (c)(1),
(2) Date: Mar. 15, 2023

(87) PCT Pub. No.: WO2022/057250
PCT Pub. Date: Mar. 24, 2022

(65) Prior Publication Data
US 2023/0334627 A1   Oct. 19, 2023

(30) Foreign Application Priority Data
Sep. 15, 2020   (CN) .......................... 202010965873.1

(51) Int. Cl.
*G06T 5/70* (2024.01)
*G06T 7/187* (2017.01)
*G06T 17/20* (2006.01)

(52) U.S. Cl.
CPC ................ *G06T 5/70* (2024.01); *G06T 7/187* (2017.01); *G06T 17/20* (2013.01); *G06T 2207/20028* (2013.01)

(58) Field of Classification Search
CPC combination set(s) only.
See application file for complete search history.

(56) References Cited

U.S. PATENT DOCUMENTS

2019/0258225 A1   8/2019   Link et al.

FOREIGN PATENT DOCUMENTS

| CN | 105741355 A | 7/2016 |
|----|----|----|
| CN | 107045732 A | 8/2017 |

(Continued)

OTHER PUBLICATIONS

Mesh Denoising via L0 Minimization (Year: 2013).*
(Continued)

*Primary Examiner* — Vu Le
*Assistant Examiner* — Matthew James Bodnark
(74) *Attorney, Agent, or Firm* — Yue (Robert) Xu; Apex Attorneys at Law, LLP

(57) ABSTRACT

A method for segmenting and denoising a triangle mesh, the method comprising: reading triangle mesh data containing N triangular patches, determining the noise level of the triangle mesh data, and optimizing data at a noise level higher than a preset value; segmenting the triangle mesh data by using a region growing segmentation algorithm, such that a plurality of sub-regions of the triangle mesh data are formed; optimizing the segmented triangle mesh data by using a hole-filling algorithm; and filtering the segmented triangle mesh data by using a denoising algorithm.

7 Claims, 7 Drawing Sheets

(56) References Cited

FOREIGN PATENT DOCUMENTS

| CN | 108898558 A | 11/2018 | | |
|----|---|---|---|---|
| CN | 109345627 A | 2/2019 | | |
| CN | 110497727 A | 11/2019 | | |
| CN | 110930334 A | 3/2020 | | |
| CN | 112085750 A | 12/2020 | | |
| KR | 20030017888 A | * | 3/2003 | ............ G06T 17/00 |
| WO | WO2003027961 A2 | * | 4/2003 | ............ G06T 17/20 |

OTHER PUBLICATIONS

Noise removal from 3D Meshes: An efficient approach (Year: 2020).*
Regions Segmentation Algorithm of Triangle Meshes Based on Normal Vector (Year: 2010).*
International Search Report for PCT/CN2021/087447 mailed Jul. 21, 2021, ISA/CN.
Chaofan Dai et al, Segmentation Based Mesh Denoising, arXiv:2008. 01358v2 [cs.GR] Aug. 24, 2020, pp. 1-11.
The 1st Office Action dated May 29, 2023 for the Chinese Patent Application No. CN202010965873.1. English Translation of the 1st Office Action.

* cited by examiner (a) $D_{thr} = 0.4$  (b) $D_{thr} = 0.6$  (c) $D_{thr} = 0.8$  (d) $D_{thr} = 0.1$ (a) (b) (c) (d)

METHOD FOR SEGMENTING AND DENOISING TRIANGLE MESH

The present application is the national phase of International Patent Application No. PCT/CN2021/087447, titled "METHOD FOR SEGMENTING AND DENOISING TRIANGLE MESH", filed on Apr. 15, 2021, which claims priority to Chinese Patent Application No. 202010965873.1, titled "METHOD FOR SEGMENTING AND DENOISING TRIANGLE MESH" filed on Sep. 15, 2020 with the China National Intellectual Property Administration, both of which are incorporated herein by reference in their entireties.

FIELD

The present disclosure relates to the technical field of image processing, and in particular to a segmenting and denoising method based on triangle meshes.

BACKGROUND

With the wide application of the three-dimensional scanning data technology in fields such as artificial intelligence device manufacturing, industrial detection, target identification and VR/AR, improving the quality of the scanned data is of great significance for the development of the above fields. In related technology, the amount of initial point cloud data obtained through three-dimensional scanning is very large, and the amount of data to be stored is huge, so that it is difficult to perform algorithm processing. Therefore, it is usually required to perform surface reconstruction on initial data to obtain a triangular mesh model, so as to obtain simple and common data.

However, in the scanning and reconstruction processes, the triangular mesh model is inevitably contaminated by noise. Due to the noise, the data quality of the triangular mesh model is to be reduced, and subsequent mesh processing is to be affected, thereby affecting the effect of three-dimensional scanned images. The denoising methods and technologies in the conventional technology have at least the following three problems. (1) According to most of the triangular mesh denoising methods in the conventional technology, local neighborhood information is used. In performing denoising, isotropic points or surfaces in a neighborhood are assigned larger weights, and anisotropic points or surfaces in the neighborhood are assigned smaller weights. However, the smaller weights still affect the denoising effect, resulting in destroying the sharp feature to some extent. (2) In order to suppress the influence of the anisotropic points or faces on the denoising effect, parameters such as an angle and a distance are introduced in performing denoising, increasing the difficulty of parameter tuning. Moreover, it is difficult to achieve an expected effect in this way, especially for those skilled in the art that are not familiar with algorithms, which often increases their burden. (3) In other methods according to the conventional technology, mesh denoising is performed based on more information, resulting in a large amount of computation and slow speed.

SUMMARY

A segmenting and denoising method based on triangle meshes is provided according to the present disclosure, effectively segmenting a model with noise, improving the speed of processing noise, and effectively preserving boundary features and details of data.

A segmenting and denoising method based on triangle meshes is provided according to an embodiment. The method includes: reading triangle mesh data including N triangular patches, determining a noise level of the triangle mesh data, and optimizing triangle mesh data having a noise level greater than a predetermined threshold where N is greater than one; segmenting the triangle mesh data by using a region growing segmentation algorithm to form multiple sub-regions; optimizing the segmented triangle mesh data by using a hole-filling algorithm; and filtering the segmented triangle mesh data by using a denoising algorithm.

DETAILED DESCRIPTION OF THE EMBODIMENTS

Figure 1:
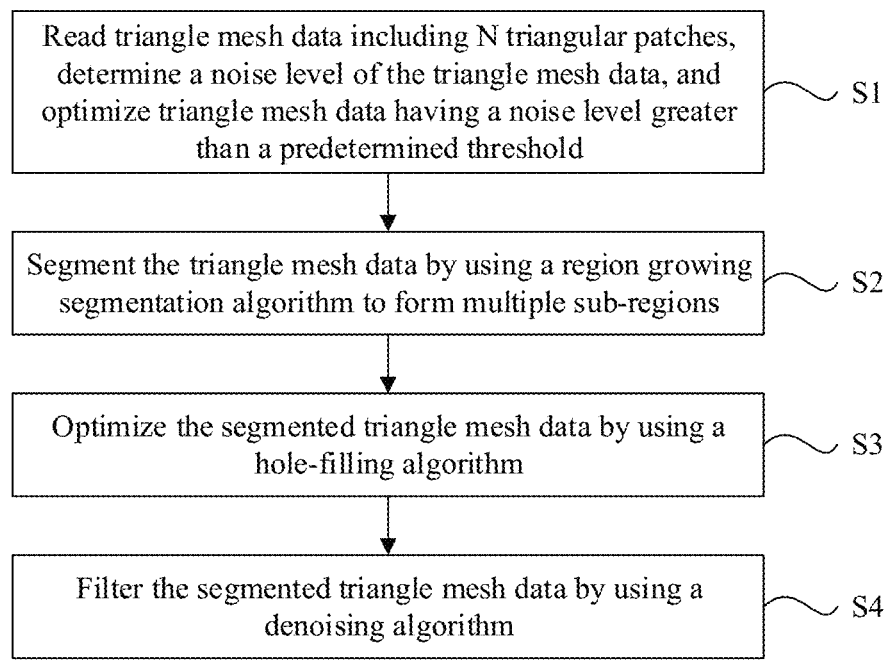
FIG. 1 is a flowchart of a segmenting and denoising method based on triangle meshes according to an embodiment of the present disclosure.

In the description of the present disclosure, it should be understood that the orientation or positional relationship indicated by the terms, such as "up", "low", "front", "back", "left", "right" and "horizontal", are based on the orientation or positional relationship shown in the drawings, which are only for facilitating the description of the present disclosure and simplifying the description, rather than indicating or implying that the device or element referred to must have a specific orientation, and be constructed and operated in a particular orientation. Therefore, the above terms should not be understood as a limitation to the present disclosure.

In the description of the present disclosure, terms such as "installation", "link", "connection" and "fix" should be understood broadly, unless otherwise specifically defined. For example, it may be a fixed connection, a detachable connection, or an integral connection; it may be a mechanical connection or an electrical connection; and it may be a direct connection, an indirect connection through an intermediate medium, or an internal connection between two components. Those skilled in the art should understand specific meanings of the above terms in the present disclosure based on specific situations.

The present disclosure is further described in detail with reference to FIG. 1 to FIG. 12 and embodiments. However, the present disclosure is not limited to the Figures and the embodiments.

A segmenting and denoising method based on triangle meshes is provided according to the present disclosure. The method includes the following steps S1 to S4.

In step S1, triangle mesh data including N triangular patches is read, where N is greater than one. A noise level of the triangle mesh data is determined. Triangle mesh data, having a noise level $\delta$ greater than or equal to 0.3 le, is optimized, where le is a noise level unit. For triangle mesh data having a noise level less than 0.3 le, proceed to step S2.

For example, in a case that the read triangular mesh data only includes a Gaussian noise, it can be seen that based on a probability density function $$p(z) = \frac{1}{\sqrt{2\pi}\sigma} \exp\left(-\frac{(z-\mu)^2}{2\sigma^2}\right)$$

of the Gaussian noise, a Gaussian noise having a $\sigma$ greater than or equal to 0.3 is defined as a large noise, where z represents coordinates of the triangular mesh, u represents an average of local coordinates of the triangular mesh, and a represents a standard deviation.

In step S1, the data having a large noise level is optimized by constructing an objective optimization function to enhance boundary information of the data and facilitate segmenting the data. The objective optimization function may be expressed as:

$$\min \sum_i \|\tilde{p}_i - p_i\|_2^2 + \alpha \sum_e w(e)\|D(e)\|_2^2 + \beta \sum_e w(e)\|R(e)\|_2^2.$$

Figure 2:
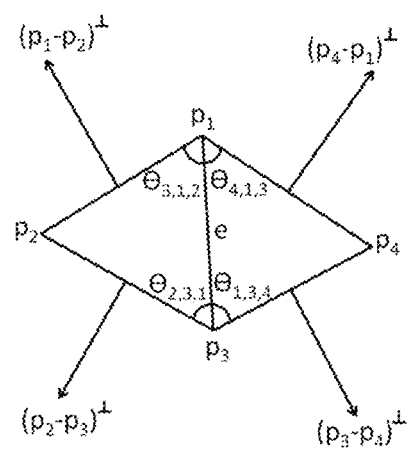
FIG. 2 is a schematic structural diagram of two triangles sharing a same side according to an embodiment of the present disclosure.

There are some side-sharing triangles among the multiple triangular patches. $\tilde{p}_i$ represents an i-th vertex that has been optimized, $p_i$ represents an i-th vertex that has not been optimized, $$\|\tilde{p}_i - p_i\|_2^2$$

represents a second norm of the vertex $\tilde{p}_i$ and the vertex $p_i$, $\alpha$ and $\beta$ represent weight coefficients, w(e) represents a weight distribution function of a side based on a normal, $$\|D(e)\|_2^2$$

represents a second norm of a differential edge operator D(e) of each of side-sharing triangles, R(e) represents a constraint coefficient of a triangular patch, and $$\|R(e)\|_2^2$$

represents a second norm of the constraint coefficient R(e) of the triangular patch. As shown in FIG. 2, in a case that four vertices of two side-sharing triangles are represented by p1, p2, p3, and p4, $R(e)=(p1-p2=p3-p4)^2$. Therefore, shapes of the triangle patches are effectively optimized, avoiding spikes in the data and flipped triangular patches.

In step S2, the triangle mesh data is segmented by using a region growing segmentation algorithm to form multiple sub-regions.

According to the conventional region growing algorithm, diffusion is usually performed based on a position relationship, and a normal or connection information may be used as a condition for determining a growing boundary. However, for a model with a noise, the determination based on a normal is easily affected by the noise. Therefore, in the solution according to the present disclosure, a predetermined threshold $D_{thr}$ is set as a segmentation intensity coefficient and as a condition for determining a growing boundary. In a case that two side-sharing triangles are coplanar, an L2 norm (modulus length) of the differential edge operator D(e) of the two side-sharing triangles is equal to zero. The L2 norm refers to a square root of a sum of squares of all elements of a vector. Therefore, boundary features may be extracted by calculating the modulus length of the differential edge operator.

According to the present disclosure, in the segmentation by using the region growing segmentation algorithm, a feature and a signal of a current region are concentrated, effectively reducing the influence of signals from different regions. In addition, compared with the conventional technology, in the optimization process according to the present disclosure, the data with a noise is segmented and then is filtered, and denoising processing is performed on each of sub-regions obtained by performing region segmenting, effectively preserving boundary features and details. Furthermore, with the technical solutions according to the present disclosure, the stability of the algorithms is significantly improved, and a good optimization effect can be achieved in segmenting a model with a nose.

In step S2-1, a triangular patch is selected from the triangle mesh data, side-sharing triangles of the triangular patch are traversed, and a differential edge operator D(e) for each of the side-sharing triangles is calculated.

In step S2-2, the threshold $D_{thr}$ is determined as a condition for determining a region growing boundary. For each of the side-sharing triangles, a norm $\|D(e)\|$ is calculated. A side-sharing triangle, having a norm $\|D(e)\|$ less than $D_{thr}$, of the triangular patch is grouped into a same sub-region as the triangular patch.

Figure 3:
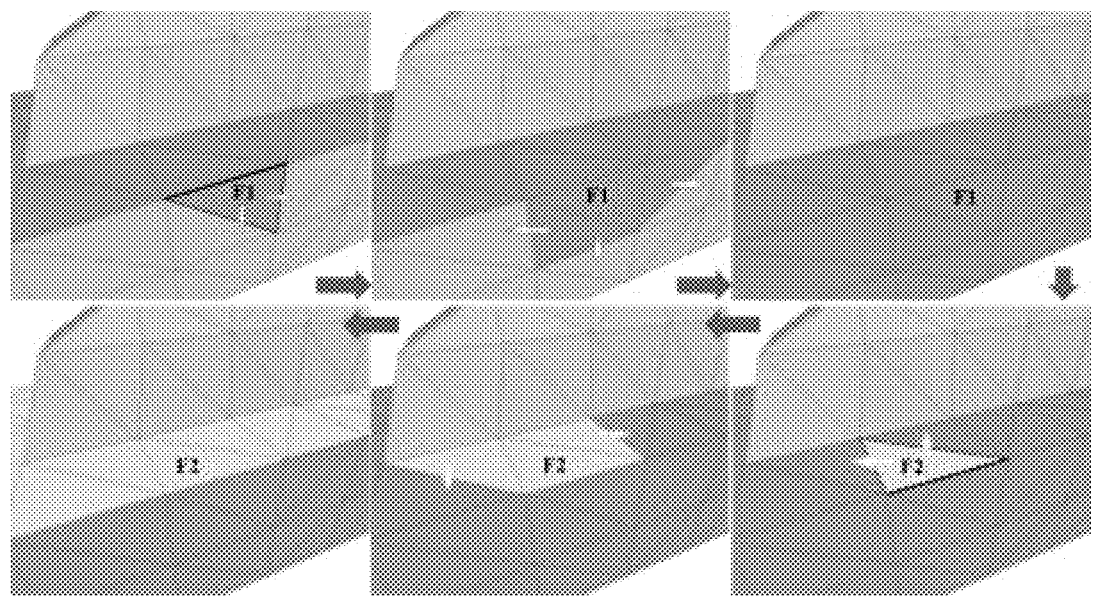
FIG. 3 is a schematic diagram showing an effect of segmenting triangle mesh data to form multiple sub-regions according to an embodiment of the present disclosure.

As shown in FIG. 3, F1 represents a seed patch that has not been segmented. Each of side-sharing triangles of the seed patch is traversed. For each of the side-sharing triangles of the seed patch, it is determined whether a norm $\|D(e)\|$ of the side-sharing triangle is less than $D_{thr}$, and the side-sharing triangle is marked as a new seed patch F2 in a case that norm $\|D(e)\|$ of the side-sharing triangle is less than $D_{thr}$. Then, diffusion and clustering are continuously performed until norms $\|D(e)\|$ of all new seed patches are greater than $D_{thr}$.

In addition, due to the noise, after the triangular mesh model is segmented into multiple sub-regions in step S2, there may be some local "small region" meshes that are incorrectly segmented, which seriously affect the denoising effect. With a hole-filling algorithm, refinement and optimization are performed, thereby obtaining an accurate segmentation result.

In step S3, the segmented triangle mesh data is optimized by using a hole-filling algorithm.

In step S3-1, the multiple sub-regions are retrieved to obtain a to-be-corrected triangle.

In step S3-2, a second-order neighborhood $S(i)$ of each of the to-be-corrected triangle is traversed.

In step S3-3, for each of the to-be-corrected triangle, a normal $n_i$ of the to-be-corrected triangle is determined, a normal $n_j$ of a triangle in each of regions in the second-order neighborhood $S(i)$ is determined, and the $n_i$ and the $n_j$ are accumulated. The $n_i$ and the $n_j$ are accumulated by using the following equation:

$$A = \arg\max \sum_{j \in S(i)} \cos(n_i, n_j)$$

where A represents a sum obtained by accumulating a cosine value of the $n_i$ and a cosine value of the $n_j$, and $\cos(n_i, n_j)$ represents the cosine value of the $n_i$ and the cosine value of the $n_j$.

In addition, the segmentation process in the present disclosure may be embedded in a denoising algorithm for all local points or planes, which has strong versatility and excellent operation performance.

In step S4, the segmented triangle mesh data may be filtered by using a fast normal filtering algorithm, a bilateral normal filtering algorithm, a guide normal filtering algorithm, or an L1 median filtering algorithm to obtain required images.

For the fast normal filtering algorithm, the filtering process includes: performing weighted averaging on a normal of adjacent patches, eliminating an interfering patch by using a threshold, iteratively filtering a normal of a patch with a noise, and iteratively updating positions of vertices to match the denoised normal of the patch. Thus, an image is filtered.

For the bilateral normal filtering algorithm, the filtering process includes: iteratively updating a normal domain by using a spatial distance weight, a method weight and a bilateral operator, and then iteratively updating positions of vertices. Thus, an image is filtered.

For the guide normal filtering algorithm, the filtering process includes: performing joint bilateral filtering on a normal of a triangular patch, and updating positions of vertices based on the filtered normal. Thus, an image is filtered. In addition, in performing joint bilateral filtering on the normal of the triangular patch, an appropriate guiding normal should be selected.

In the L1 median filtering algorithm, the filtering process includes: preprocessing an inputted mesh with a noise, estimating a normal of a denoised patch by using an L1 median filter, and iteratively updating positions of vertices. Thus, an image is filtered.

For each of the side-sharing triangles, the differential edge operator $D(e)$ is calculated by using the following equation:

$$D(e) = \begin{bmatrix} \frac{\Delta_{1,2,3}(p_4 - p_3) \cdot (p_3 - p_1) + \Delta_{1,3,4}(p_1 - p_3) \cdot (p_3 - p_2)}{(|p_3 - p_1|)^2(\Delta_{1,2,3} + \Delta_{1,3,4})} \\ \frac{\Delta_{1,3,4}}{\Delta_{1,2,3} + \Delta_{1,3,4}} \\ \frac{\Delta_{1,2,3}(p_3 - p_1) \cdot (p_1 - p_4) + \Delta_{1,3,4}(p_2 - p_1) \cdot (p_1 - p_3)}{(|p_3 - p_1|)^2(\Delta_{1,2,3} + \Delta_{1,3,4})} \\ \frac{\Delta_{1,2,3}}{\Delta_{1,2,3} + \Delta_{1,3,4}} \end{bmatrix}^T \begin{bmatrix} p_1 \\ p_2 \\ p_3 \\ p_4 \end{bmatrix}$$

where $p_1$, $p_2$, $p_3$, and $p_4$ represent four vertices of two triangles sharing a same side; in a three-dimensional rectangular coordinate system, coordinates of $p_1$ are expressed as $(x_1, y_1, z_1)$, coordinates of $p_2$ are expressed as $(x_2, y_2, z_2)$, coordinates of $p_3$ are expressed as $(x_3, y_3, z_3)$, coordinates of $p_4$ are expressed as $(x_4, y_4, z_4)$, $p_1$-$p_3$ represents $(x_1, y_1, z_1)$-$(x_3, y_3, z_3)$, $p_1$-$p_4$ represents $(x_1, y_1, z_1)$-$(x_4, y_4, z_4)$, $p_3$-$p_1$ represents $(x_3, y_3, z_3)$-$(x_1, y_1, z_1)$, $p_2$-$p_1$ represents $(x_2, y_2, z_2)$-$(x_1, y_1, z_1)$, $p_3$-$p_2$ represents $(x_3, y_3, z_3)$-$(x_2, y_2, z_2)$, and $p_4$-$p_3$ represents $(x_4, y_4, z_4)$-$(x_3, y_3, z_3)$; $\Delta_{1,2,3}$ represents an area of a triangle defined by $p_1$, $p_2$ and $p_3$, and $\Delta_{1,3,4}$ represents an area of a triangle defined by $p_1$, $p_3$ and $p_4$.

The norm $\|D(e)\|$ is calculated by using the following equation:

$$\|D(e)\| = \sqrt{D(e)_x^2 + D(e)_y^2 + D(e)_z^2}$$

where $D(e)_x$ represents a differential edge operator for a side-sharing triangle in an x direction of a three-dimensional rectangular coordinate system, $D(e)_y$ represents a differential edge operator for a side-sharing triangle in a y direction of the three-dimensional rectangular coordinate system, and $D(e)_z$ represents a differential edge operator for a side-sharing triangle in a z direction of the three-dimensional rectangular coordinate system.

Figure 4:
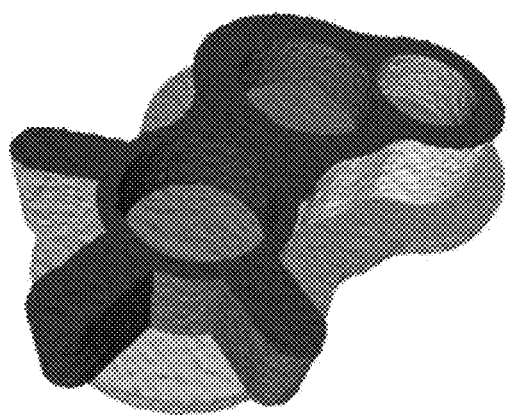
FIG. 4 is a schematic diagram showing an effect of segmenting a model with a small noise according to an embodiment of the present disclosure.
Figure 5:
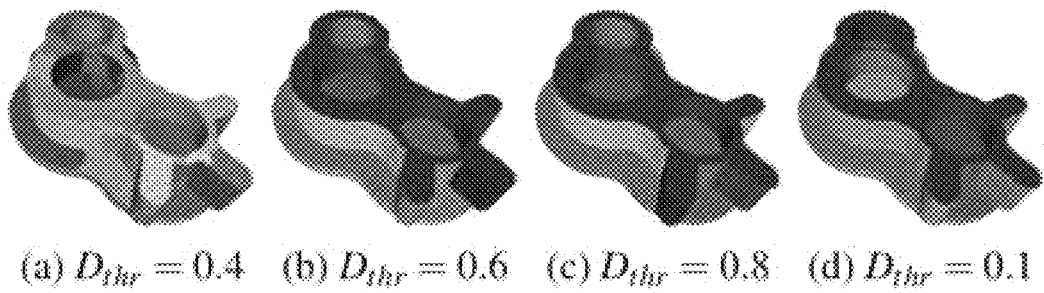
FIG. 5 is a schematic diagram showing effects of segmenting a model with a small noise at different $D_{thr}$ according to an embodiment of the present disclosure.
Figure 6:
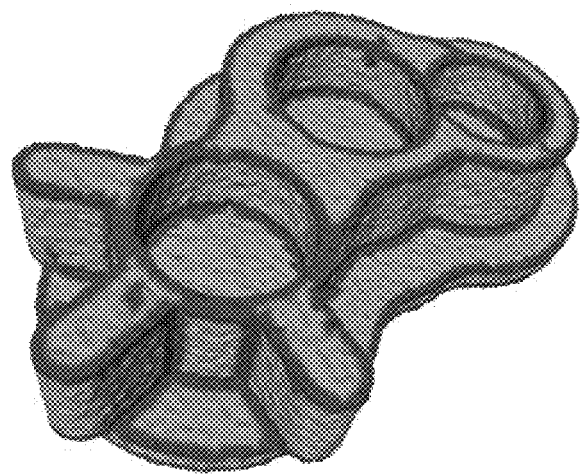
FIG. 6 is a schematic diagram showing an effect of marking an edge, having a noise level greater than a predetermined $D_{thr}$, of a model with a small noise at the $D_{thr}$ according to an embodiment of the present disclosure.

As shown in FIG. 4 and FIG. 5, a model with a noise level $\delta$ equal to 0.2 le is segmented by performing the operations described in the above step S2. The segmentation effect varies with the segmentation intensity coefficient $D_{thr}$. It can be seen from FIG. 6 that a boundary of the model may be determined and extracted by comparing $\|D(e)\|$ with $D_{thr}$, facilitating subsequent denoising processing.

Figure 7:
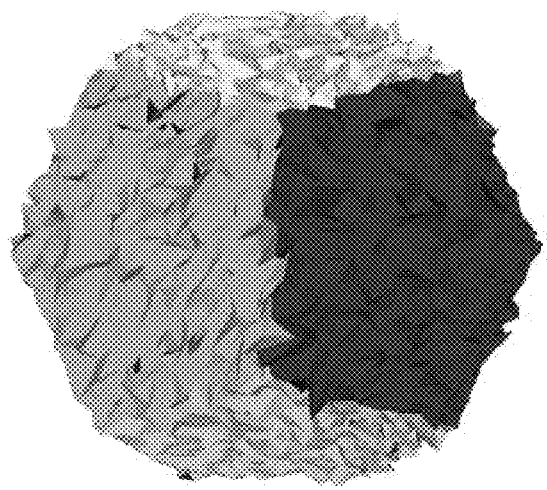
FIG. 7 is a schematic diagram showing segmenting a model with a large noise and marking the segmented model with the large noise to the original model with the large noise according to an embodiment of the present disclosure.

As shown in FIG. 7, a model with a large noise having a noise level $\delta$ equal to 0.4 le is taken as an example. The model is optimized, then is segmented, and then is refined by using a region hole-filling algorithm, and finally is marked to the original model.

Figure 8:
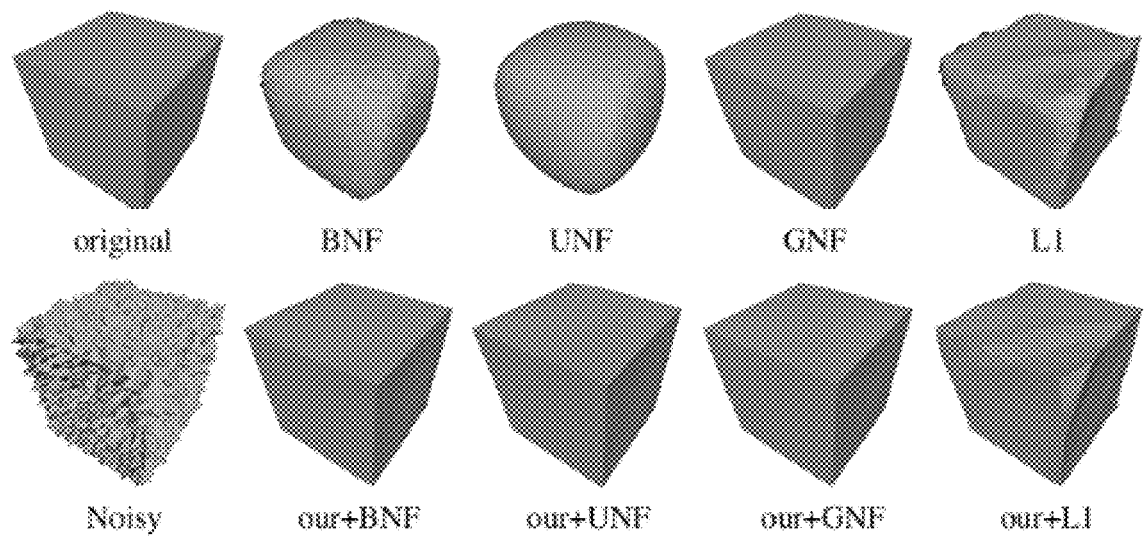
FIG. 8 is a schematic diagram showing an effect of denoising a model with a large noise according to an embodiment of the present disclosure.

As shown in FIG. 8, a cube-shape model with a noise level $\delta$ equal to 0.8 le is taken as an example. The noise level of the model is too large, so that the model is preprocessed to enhance boundary information. Then, the model is segmented. The segmentation and clustering are marked to the original model. Then, denoising is performed. In FIG. 8, UNF represents the fast normal filtering algorithm, BNF represents the bilateral normal filtering algorithm, and GNF represents the guide normal filtering algorithm. The upper row in FIG. 8 shows a denoising effect by using the denoising methods according to the conventional technology. The upper row in FIG. 8, from left to right, shows an original model, a model obtained with the bilateral normal filtering algorithm, a model obtained with the fast normal filtering algorithm, a model obtained with the guide normal filtering algorithm, and a model obtained with the L1 median filtering algorithm. The lower row in FIG. 8 shows a denoising effect by using the denoising method based on a segmentation framework according to the present disclosure. The lower row in FIG. 8, from left to right, shows an original model marked with a segmentation result, a model obtained by performing segmentation and then filtering by using the bilateral normal filtering algorithm, a model obtained by performing segmentation and then filtering by using the fast normal filtering algorithm, a model obtained by performing segmentation and then filtering by using the guide normal filtering algorithm, and a model obtained by performing segmentation and then filtering by using the L1 median filtering algorithm. It is apparent that the optimization effect of the image obtained by using the method according to the present disclosure is better.

Figure 9:
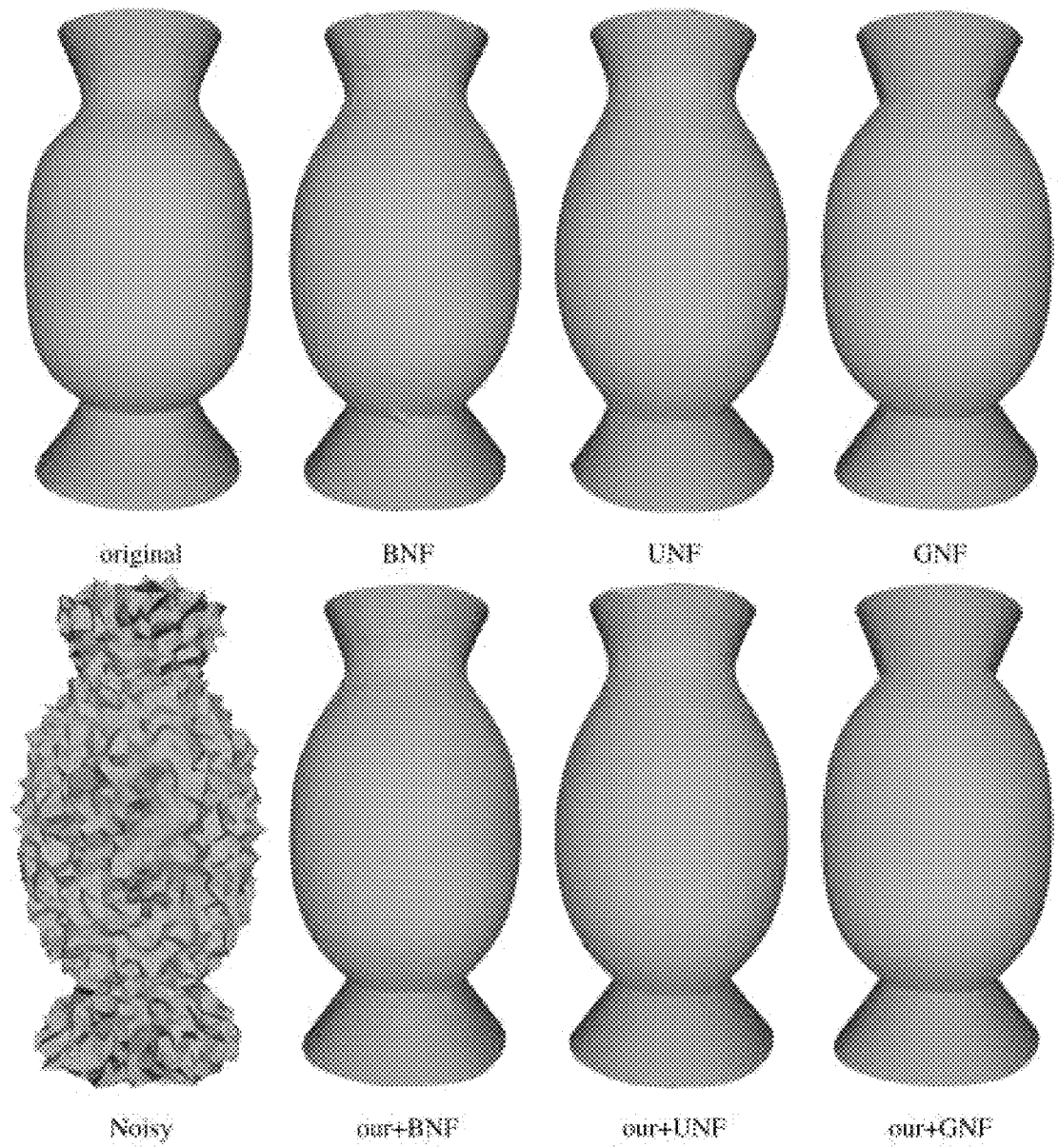
FIG. 9 is a schematic diagram showing an effect of denoising a model with a large noise according to another embodiment of the present disclosure.

As shown in FIG. 9, a vase model with a noise level δ equal to 0.5 le is taken as an example. By comparing the upper row and the lower row in FIG. 9, it can be seen that the denoising method based on a segmentation framework has a better denoising effect. The English letters in FIG. 9 represent the same meaning as the English letters in FIG. 8.

Figure 10:
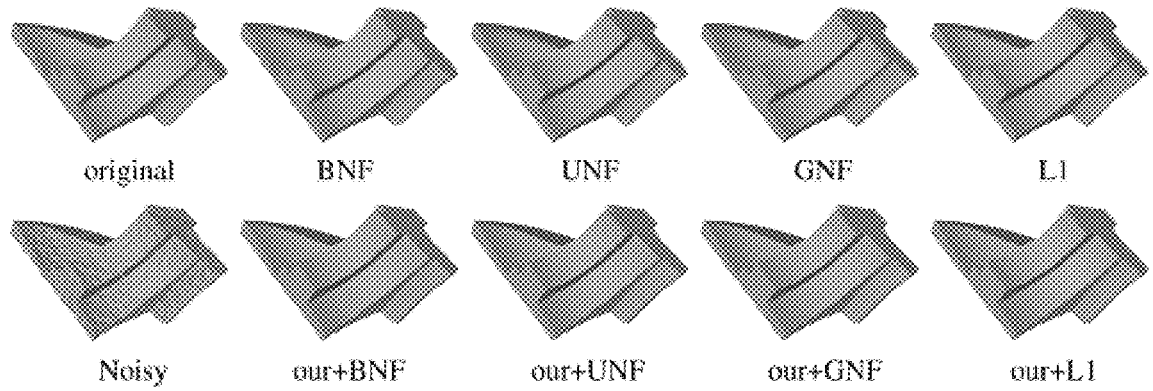
FIG. 10 is a schematic diagram showing an effect of denoising a model with a small noise according to an embodiment of the present disclosure.

As shown in FIG. 10, a fandiah model with a noise level δ equal to 0.1 le is taken as an example. By comparing the upper row and the lower row in FIG. 10, it can be seen that the denoising method based on a segmentation framework has a better denoising effect. The English letters in FIG. 10 represent the same meaning as the English letters in FIG. 8.

Figure 11:
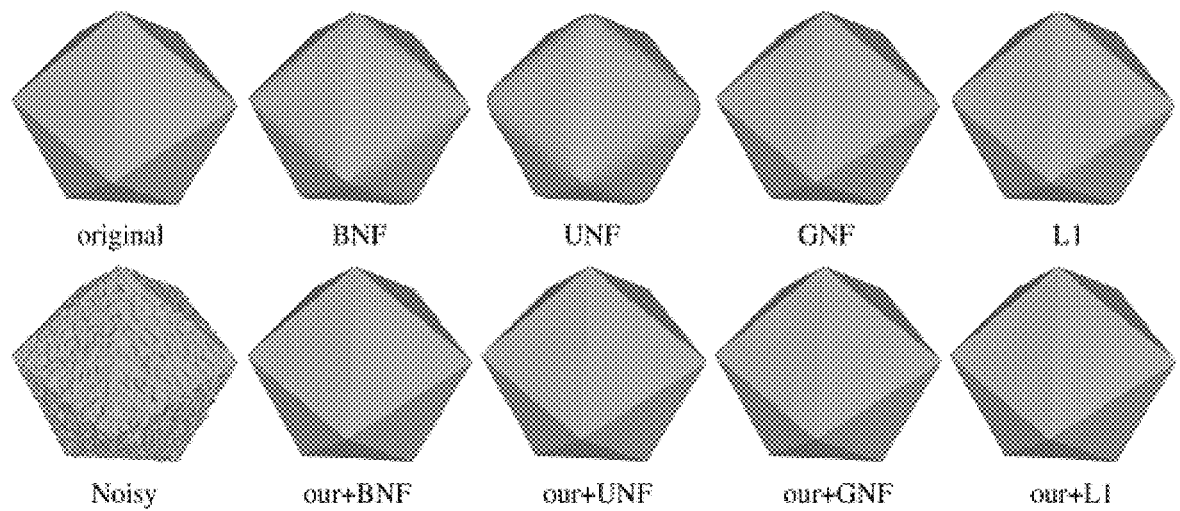
FIG. 11 is a schematic diagram showing an effect of denoising a model with a small noise according to another embodiment of the present disclosure.

As shown in FIG. 11, a dodecahedron model with a noise level δ equal to 0.2 le is taken as an example. By comparing the upper row and the lower row in FIG. 11, it can be seen that the denoising method based on a segmentation framework has a better denoising effect. The English letters in FIG. 11 represent the same meaning as the English letters in FIG. 8.

Figure 12:
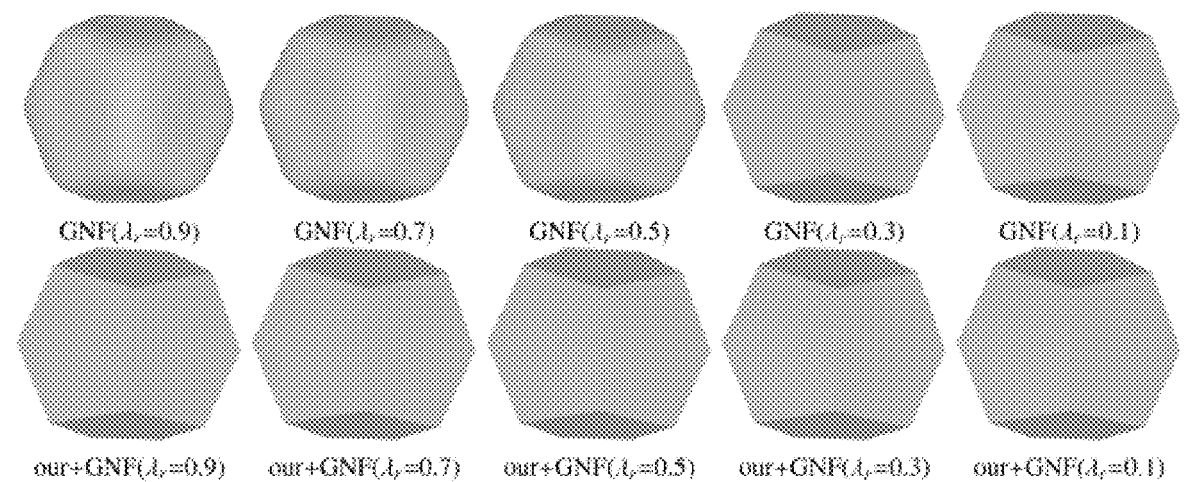
FIG. 12 is a schematic diagram showing an effect of denoising a model with a small noise with different Gaussian space filtering kernels according to an embodiment of the present disclosure.

As shown in FIG. 12, a dodecahedron model with a noise level δ equal to 0.2 le is taken as an example. By comparing the upper row and the lower row in FIG. 12, it can be seen that in a case of performing the guide normal filtering algorithm, for different Gaussian space filtering kernels λr, a denoising effect of the denoising method based on a segmentation framework is less affected by the parameter λr, and the denoising method based on a segmentation framework has a better optimization effect.

Figure 13:
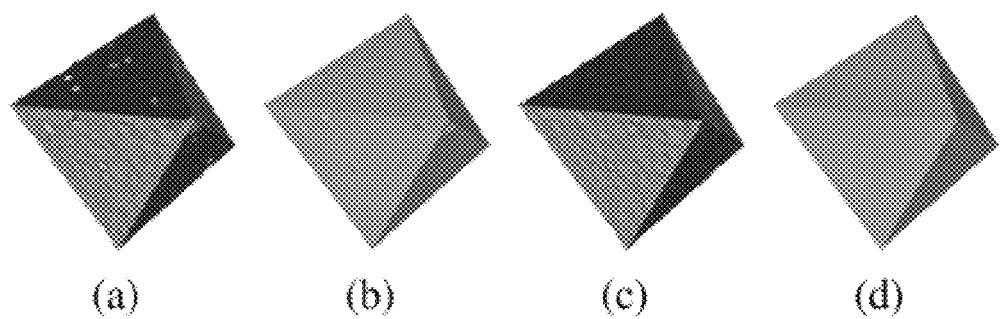
FIG. 13 is a schematic diagram showing results of denoising a model with a small noise with a hole-filling algorithm and without a hole-filling algorithm according to an embodiment of the present disclosure.

As shown in FIG. 13, an octahedron model with a noise level δ equal to 0.1 le is taken as an example. A denoising result with the hole-filling algorithm and a denoising result without the hole-filling algorithm are compared. The diagram (a) in FIG. 13 shows a clustering result without the hole-filling algorithm. The diagram (b) in FIG. 13 shows a result obtained by performing denoising based on the clustering result without the hole-filling algorithm as shown in diagram (a). The diagram (c) in FIG. 13 shows a result obtained by performing clustering optimization based on the result as shown in diagram (b) with the hole-filling algorithm. The diagram (d) in FIG. 13 shows a result obtained by performing denoising based on the result as shown in diagram (c). It can be seen from the diagrams in FIG. 13 that a denoising effect with the hole-filling algorithm is better.

The segmentation algorithm in the present disclosure is performed for subsequent denoising algorithm. With the segmentation algorithm, a framework for enhancing the triangular mesh denoising algorithm in the conventional technology is provided, thereby improving the performance of the denoising algorithm. In addition, some denoising algorithms are embedded in the segmented model according to the present disclosure, avoiding the influence of a non-heterogeneous neighborhood on the denoising result, improving the operational performance, thereby effectively and significantly enhancing the protection of the sharp features.

The invention claimed is:

1. A segmenting and denoising method based on triangle meshes, comprising:

reading triangle mesh data comprising N triangular patches, determining a noise level of the triangle mesh data, and optimizing triangle mesh data having a noise level greater than a predetermined threshold, wherein N is greater than one;

segmenting the triangle mesh data by using a region growing segmentation algorithm to form a plurality of sub-regions;

optimizing the segmented triangle mesh data by using a hole-filling algorithm; and filtering the segmented triangle mesh data by using a denoising algorithm;

wherein the optimizing the segmented triangle mesh data by using a hole-filling algorithm comprises:

retrieving the plurality of sub-regions to obtain a to-be-corrected triangle;

traversing a second-order neighborhood S (i) of the to-be-corrected triangle; and determining a normal $n_i$ of the to-be-corrected triangle, determining a normal $n_j$ of a triangle in each of regions in the second-order neighborhood S (i), and accumulating the $n_i$ and the $n_j$.

2. The segmenting and denoising method based on triangle meshes according to claim 1, wherein the segmenting the triangle mesh data by using a region growing segmentation algorithm to form a plurality of sub-regions comprises:

selecting a triangular patch of the triangle mesh data, traversing each of side-sharing triangles of the triangular patch, and calculating a differential edge operator D(e) for each of the side-sharing triangles of the triangular patch; and determining a threshold $D_{thr}$ as a condition for determining a region growing boundary, calculating a norm $\|D(e)\|$ for each of the side-sharing triangles of the triangular patch, and grouping a side-sharing triangle, having a norm $\|D(e)\|$ less than $D_{thr}$, of the triangular patch into a same sub-region as the triangular patch.

3. The segmenting and denoising method based on triangle meshes according to claim 2, wherein for each of the side-sharing triangles, the differential edge operator D(e) is calculated by using the following equation:

$$D(e) = \begin{bmatrix} \frac{\Delta_{1,2,3}(p_4 - p_3) \cdot (p_3 - p_1) + \Delta_{1,3,4}(p_1 - p_3) \cdot (p_3 - p_2)}{(|p_3 - p_1|)^2(\Delta_{1,2,3} + \Delta_{1,3,4})} \\ \frac{\Delta_{1,3,4}}{\Delta_{1,2,3} + \Delta_{1,3,4}} \\ \frac{\Delta_{1,2,3}(p_3 - p_1) \cdot (p_1 - p_4) + \Delta_{1,3,4}(p_2 - p_1) \cdot (p_1 - p_3)}{(|p_3 - p_1|)^2(\Delta_{1,2,3} + \Delta_{1,3,4})} \\ \frac{\Delta_{1,2,3}}{\Delta_{1,2,3} + \Delta_{1,3,4}} \end{bmatrix}^T \begin{bmatrix} p_1 \\ p_2 \\ p_3 \\ p_4 \end{bmatrix}$$

where $p_1$, $p_2$, $p_3$, and $p_4$ represent four vertices of two triangles sharing a same side; in a three-dimensional rectangular coordinate system, coordinates of $p_1$ are expressed as $(x_1, y_1, z_1)$, coordinates of $p_2$ are expressed as $(x_2, y_2, z_2)$, coordinates of $p_3$ are expressed as $(x_3, y_3, z_3)$, coordinates of $p_4$ are expressed as $(x_4, y_4, z_4)$, $p_1$-$p_3$ represents $(x_1, y_1,$ $z_1$)-($x_3$, $y_3$, $z_3$), $p_1$-$p_4$ represents ($x_1$, $y_1$, $z_1$)-($x_4$, $y_4$, $z_4$), $p_3$-$p_1$ represents ($x_3$, $y_3$, $z_3$)-($x_1$, $y_1$, $z_1$), $p_2$-$p_1$ represents ($x_2$, $y_2$, $z_2$)-($x_1$, $y_1$, $z_1$), $p_3$-$p_2$ represents ($x_3$, $y_3$, $z_3$)-($x_2$, $y_2$, $z_2$), and $p_4$-$p_3$ represents ($x_4$, $y_4$, $z_4$)-($x_3$, $y_3$, $z_3$); $\Delta_{1,2,3}$ represents an area of a triangle defined by $p_1$, $p_2$ and $p_3$, and $\Delta_{1,3,4}$ represents an area of a triangle defined by $p_1$, $p_3$ and $p_4$.

4. The segmenting and denoising method based on triangle meshes according to claim 2, wherein the norm $\|D(e)\|$ is calculated by using the following equation:

$$\|D(e)\| = \sqrt{D(e)_x^2 + D(e)_y^2 + D(e)_z^2}$$

where $D(e)_x$ represents a differential edge operator for a side-sharing triangle in an x direction of a three-dimensional rectangular coordinate system, $D(e)_y$ represents a differential edge operator for a side-sharing triangle in a y direction of the three-dimensional rectangular coordinate system, and $D(e)_z$ represents a differential edge operator for a side-sharing triangle in a z direction of the three-dimensional rectangular coordinate system.

5. The segmenting and denoising method based on triangle meshes according to claim 1, wherein the $n_i$ and the $n_j$ are accumulated by using the following equation:

$$A = \arg\max \sum_{j \in S(i)} \cos(n_i, n_j)$$

where A represents a sum obtained by accumulating a cosine value of the $n_i$ and a cosine value of the $n_j$, and $\cos(n_i, n_j)$ represents the cosine value of the $n_i$ and the cosine value of the $n_j$.

6. The segmenting and denoising method based on triangle meshes according to claim 1, wherein triangle mesh data, having a noise level $\delta$ greater than or equal to 0.3 le, is optimized, and le is a noise level unit.

7. The segmenting and denoising method based on triangle meshes according to claim 1, wherein the filtering the segmented triangle mesh data by using a denoising algorithm comprises: filtering the segmented triangle mesh data by using a fast normal filtering algorithm, a bilateral normal filtering algorithm, a guide normal filtering algorithm, and an L1 median filtering algorithm.

\* \* \* \* \*